United States Patent
Lim et al.

(10) Patent No.: US 9,467,930 B2
(45) Date of Patent: Oct. 11, 2016

(54) METHOD AND APPARATUS FOR PERFORMING DEVICE-TO-DEVICE COMMUNICATION IN WIRELESS ACCESS SYSTEM

(75) Inventors: Dongguk Lim, Anyang-si (KR); Jiwoong Jang, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 14/238,966

(22) PCT Filed: Aug. 16, 2012

(86) PCT No.: PCT/KR2012/006511
§ 371 (c)(1),
(2), (4) Date: Apr. 9, 2014

(87) PCT Pub. No.: WO2013/025057
PCT Pub. Date: Feb. 21, 2013

(65) Prior Publication Data
US 2015/0296443 A1    Oct. 15, 2015

Related U.S. Application Data (60) Provisional application No. 61/523,855, filed on Aug. 16, 2011.

(51) Int. Cl.
| | | |
|---|---|---|
| *H04L 1/00* | (2006.01) | |
| *H04W 48/12* | (2009.01) | |
| *H04W 76/02* | (2009.01) | |
| *H04L 5/00* | (2006.01) | |
| *H04W 8/00* | (2009.01) | |
| *H04W 72/04* | (2009.01) | |

(52) U.S. Cl.
CPC ............ *H04W 48/12* (2013.01); *H04L 5/0048* (2013.01); *H04W 8/005* (2013.01); *H04W 72/0446* (2013.01); *H04W 76/023* (2013.01); *H04L 5/0091* (2013.01); *H04W 72/042* (2013.01)

(58) Field of Classification Search
CPC ..... H04W 84/18; H04W 84/19; H04W 4/06; H04W 56/002; H04W 4/005; H04W 8/005; H04W 76/023

USPC ............... 455/41.1, 454, 459, 522, 69, 41.2, 455/67.11, 515, 500; 370/310, 312, 322
See application file for complete search history.

(56) References Cited

U.S. PATENT DOCUMENTS

| | | | |
|---|---|---|---|
| 2009/0016353 A1 | 1/2009 | Li et al. | |
| 2009/0017855 A1 | 1/2009 | Kwon et al. | |
| 2010/0261469 A1 | 10/2010 | Ribeiro et al. | |
| 2012/0115518 A1* | 5/2012 | Zeira .................... | H04W 8/005 455/500 |

FOREIGN PATENT DOCUMENTS

WO    2010078271    7/2010

OTHER PUBLICATIONS

PCT International Application No. PCT/KR2012/006511, Written Opinion of the International Searching Authority dated Feb. 25, 2013, 15 pages.

* cited by examiner

*Primary Examiner* — Dady Chery
(74) *Attorney, Agent, or Firm* — Lee, Hong, Degerman, Kang & Walmey; Jonathan Kang; Michael Monaco (57) ABSTRACT

The present invention discloses a method and apparatus for performing device-to-device (D2D) communication in a wireless access system supporting the D2D communication. More specifically, the method comprises the steps of: receiving, from a base station (BS), information regarding a discovery reference signal (DRS) transmitted from a mobile station (MS) which communicates using a cellular network; monitoring DRSs transmitted from one or more neighboring MSs; generating a list of the one or more neighboring MSs; transmitting the generated list of the one or more neighboring MSs to the BS; receiving, from the BS, information regarding resources allocated for the D2D communication; and performing the D2D communication with another BS by using the allocated resources.

7 Claims, 7 Drawing Sheets

METHOD AND APPARATUS FOR PERFORMING DEVICE-TO-DEVICE COMMUNICATION IN WIRELESS ACCESS SYSTEM

CROSS-REFERENCE TO RELATED APPLICATIONS

This application is the National Stage filing under 35 U.S.C. 371 of International Application No. PCT/KR2012/006511, filed on Aug. 16, 2012, which claims the benefit of U.S. Provisional Application Ser. No. 61/523,855, filed on Aug. 16, 2011, the contents of which are hereby incorporated by reference herein in their entirety.

TECHNICAL FIELD

The present invention relates to a wireless access system, and more particularly, to a method of performing a D2D (device-to-device) communication in a wireless access system supportive of the D2D communication and apparatus therefor.

BACKGROUND ART

Generally, in cellular communications, in order to perform a communication, a user equipment accesses a base station, receives control information for exchanging data from the base station, and then transceives data with the base station. In particular, since the user equipment transceives data through the base station, in order for the user equipment to transmit data to a different cellular user equipment, the user equipment transmits its data to the base station. Having received the data, the base station transmits the received data to the different user equipment. Thus, in order for one user equipment to transmit data to another user equipment, since the data can be transmitted through the base station only, the base station performs scheduling on channels and resources for the data transceiving and transmits channel and resource scheduled information to each user equipment. Thus, in order to perform D2D communication through the base station, each user equipment needs channel and resource allocation for transceiving data from the base station. However, according to the structure of the D2D communication, a user equipment directly transmits a signal to a desired user equipment without a base station or a relay node. Thus, in case of performing a D2D communication directly in a cellular network, the demand for a method of avoiding channel and resource allocation contention with an existing cellular user equipment is rising.

DISCLOSURE OF THE INVENTION

Technical Task

The technical task of the present invention is to provide a method of performing a D2D communication smoothly in a wireless access system and apparatus for supporting the same.

The technical task of the present invention is to provide a method of performing a D2D communication and apparatus for supporting the same, by which interference with a user equipment currently communicating using a cellular network can be avoided.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one aspect of the present invention, in a wireless access system supportive of a D2D (device-to-device) communication, a method of performing the D2D communication includes the step of receiving information on a DRS (discovery reference signal) transmitted by a user equipment performing a communication using a cellular network from a base station, monitoring the DRS transmitted from at least one neighbor user equipment, creating a list of the at least one neighbor user equipment using the DRS received from the at least one neighbor user equipment, transmitting the created list of the at least one neighbor user equipment to the base station, receiving information on a resource allocated for the D2D communication from the base station, and performing the D2D communication with a different user equipment using the allocated resource.

In another aspect of the present invention, in performing a D2D (device-to-device) communication in a wireless access system supportive of the D2D (device-to-device) communication, a user equipment includes an RF (radio frequency) unit configured to transceive a radio signal and a processor receiving information on a DRS (discovery reference signal) transmitted by a user equipment performing a communication using a cellular network from a base station, the processor monitoring the DRS transmitted from at least one neighbor user equipment, the processor creating a list of the at least one neighbor user equipment using the DRS received from the at least one neighbor user equipment, the processor transmitting the created list of the at least one neighbor user equipment to the base station, the processor receiving information on a resource allocated for the D2D communication from the base station, the processor performing the D2D communication with a different user equipment using the allocated resource.

Preferably, the list of at least one user equipment having a received signal strength equal to or greater than a threshold or the list of at least one user equipment having a received signal strength smaller than the threshold is created using a received signal strength of the DRS received from the at least one neighbor user equipment.

Preferably, the list of the at least one neighbor user equipment includes at least one of an identifier of the at least one neighbor user equipment, an index for a sequence of the DRS received from the at least one neighbor user equipment and a received signal strength for the DRS received from the at least one neighbor user equipment.

Preferably, the information on the DRS is transmitted through a paging signal or a downlink control signal.

Preferably, the information on the DRS includes at least one of a DRS transmission period, a DRS transmission length and a DRS transmission start point.

Preferably, the DRS is transmitted through a symbol located right next or previous to an SRS (sounding reference signal) transmitted symbol.

Preferably, the DRS includes an SRS (sounding reference signal).

In one aspect of the present invention, provided herein is a user equipment in a wireless communication system, in a wireless access system supportive of a D2D (device-to-device) communication, a method of performing the D2D communication includes the step of receiving information on a DRS (discovery reference signal) transmitted by a user equipment performing a communication using a cellular network from a base station, monitoring the DRS transmitted from at least one neighbor user equipment, selecting a resource having a smallest strength of a signal in the DRS received from the at least one neighbor user equipment, and performing the D2D communication with a different user equipment using the selected resource.

In another aspect of the present invention, provided herein is a base station in a wireless communication system, in performing a D2D (device-to-device) communication in a wireless access system supportive of the D2D (device-to-device) communication, a user equipment includes an RF (radio frequency) unit configured to transceive a radio signal and a processor receiving information on a DRS (discovery reference signal) transmitted by a user equipment performing a communication using a cellular network from a base station, the processor monitoring the DRS transmitted from at least one neighbor user equipment, the processor selecting a resource having a smallest strength of a signal in the DRS received from the at least one neighbor user equipment, the processor performing the D2D communication with a different user equipment using the selected resource.

Preferably, if a discovery request signal for restricting a use of the selected resource is received from the base station, a resource having a $2^{nd}$ smallest resource of a signal in the DRS received from the at least one neighbor user equipment is selected.

Preferably, information on the selected resource is transmitted to the base station and a signal for granting a use of the selected resource is received from the base station.

Preferably, the information on the DRS is transmitted through a paging signal or a downlink control signal.

Preferably, the information on the DRS includes at least one of a DRS transmission period, a DRS transmission length and a DRS transmission start point.

Preferably, the DRS is transmitted through a symbol located right next or previous to an SRS (sounding reference signal) transmitted symbol.

Preferably, the DRS includes an SRS (sounding reference signal).

Advantageous Effects

According to an embodiment of the present invention, a method of performing a D2D communication in a wireless access system is provided to achieve an efficient communication environment.

According to an embodiment of the present invention, when a D2D communication is performed, a neighbor cellular user equipment is discovered, whereby the D2D communication can be performed without causing interference due to resource contention with the neighbor cellular user equipment.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description is focused on 3GPP LTE/LTE-A, by which the technical features of the present invention are non-limited.

1. The General of D2D (Device-to-Device) Communication

In the present invention, D2D direct communication means a method of performing a direct communication between user equipments without using a base station in a situation that a channel state between at least two user equipments is good or that user equipments are located adjacent to each other. In doing so, although user equipments exchange data with each other through a direct communication, a D2D communication associated with the present invention differs from Bluetooth communication, Infrared communication or the like, in which data is exchanged between user equipments without involvement of a base station, in that prescribed control information for D2D communication is provided by a base station.

Meanwhile, in case of a client cooperative communication, a user equipment B configured to help a communication of another user equipment receives data, which is intended to be transmitted to a base station by a user equipment A, and then transmits the received data to the base station. Alternatively, the user equipment B receives data, which is intended to be transmitted to the user equipment A by the base station, and then transmits the received data to the user equipment A. In doing so, uni- or bi-directional communication between user equipments is performed within a system bandwidth. Hence, the client cooperative communication can be regarded as one example of the D2D communication. The client cooperative communication is applicable to an uplink (UL) transmission through cooperation between user equipments and is also applicable to a downlink (DL) transmission through cooperation between a base station and a user equipment, cooperation between base stations, or cooperation between antennas of DAS (distributed antenna system).

As mentioned in the above description, the user equipment A exchanges data and/or control information with the base station through the user equipment B in general. Yet, the user equipment A can exchange data and/or control information with the base station in direct depending on a situation. In particular, in consideration of a channel status with the base station and a channel status with the user equipment B, the user equipment A can exchange data with the base station in direct. In doing so, the data and/or control information directly exchanged with the base station by the user equipment A may be identical to or different from data and/or control information exchanged with the base station through the user equipment B.

A wireless communication system can support both a direct communication and a cooperative communication simultaneously or may support one of the direct communication and the cooperative communication. In case that the wireless communication supports both of the direct communication and the client cooperative communication simultaneously, a message for requesting the direct communication and a message for requesting the client cooperative communication may be identical to or different from each other.

The above-described D2D direct or client cooperative communication can be interchangeably used with such a terminology as a terminal-to-terminal communication (D2D communication, M2M (MS-to-MS) communication), a peer-to-peer (P2P) communication and the like. For clarity of the following description, embodiments of the present invention shall be described by naming it 'D2D communication' in common. In the present specification, 'D2D user equipment' means a user equipment supportive of a D2D communication and a user equipment communicating with a base station using a cellular network may be named 'cellular user equipment'.

2. D2D Communication Performing Method

Before transmitting data to a different user equipment through a D2D communication, a user equipment performing the D2D communication performs a D2D peer discovery procedure to check presences of user equipments located nearby to transceive data. Such a discovery is performed in a discovery interval and is shared with all D2D user equipments. The user equipment receives discovery signals transmitted by other D2D user equipments by monitoring logical channels in a discovery region. The user equipment discovers the discovery signals of other user equipments and then composes a neighbor D2D user equipment list using the received discovery signals. The user equipment selects a channel or resource not used by other user equipments as a discovery channel or a discovery resource and then broadcasts a discovery signal (e.g., identification information (identifier) of the user equipment). If so, other user equipments receive this signal and recognize that the corresponding user equipment is present in a range capable of performing the D2D communication.

Figure 1:
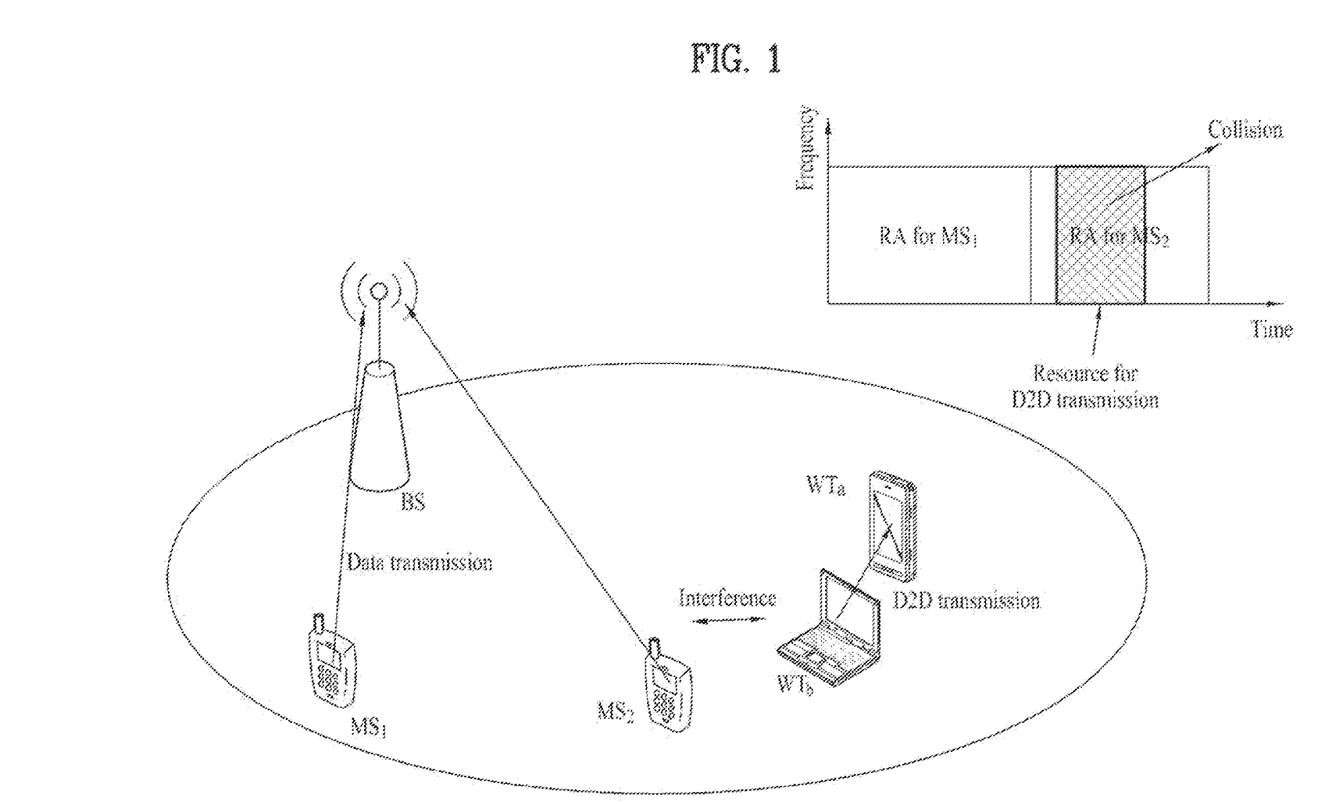
FIG. 1 shows one example that interference is caused by a D2D communication in a cellular network.

FIG. 1 shows one example that interference is caused by a D2D communication in a cellular network.

Referring to FIG. 1, user equipments MS1 and MS2 communicate with a base station using a cellular network. User equipments WTa and WTb perform D2D communication within the same cellular network. In doing so, if the user equipment WTa or WTb performing the D2D communication uses the same frequency-time resource of a user equipment performing a communication using an existing cellular network, it may cause interference with the cellular network.

FIG. 1 shows one example of a case that the frequency-time resource (e.g., RA (resource allocation) in FIG. 1) allocated to the user equipment MS2 performing a communication using the cellular network contends with the frequency-time resource allocated to the user equipments WTa and WTb performing the D2D communication. Thus, if the frequency-time resource performing the communication using the cellular network performs the communication using the same frequency-time resource of the user equipment performing the D2D communication, interference is caused between the two user equipments.

Therefore, a method of performing a D2D communication without interference with a cellular network is necessary. In the following description, the present invention proposes a method of performing a D2D communication by discovering a cellular user equipment neighbor to a D2D user equipment in order to reduce interference with the cellular user equipment, when the D2D user equipment transmits data to another user equipment in a cellular network.

Figure 2:
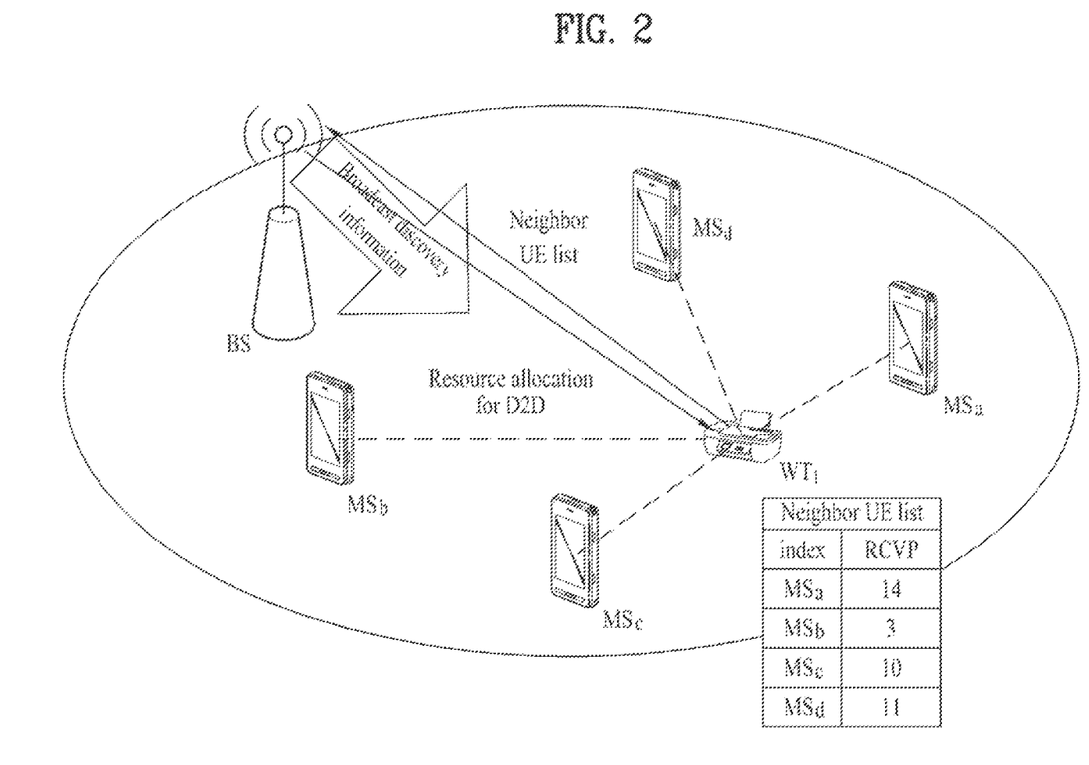
FIG. 2 is a diagram for one example of the concept of an operation for a D2D user equipment to discover a neighbor cellular user equipment according to one embodiment of the present invention.

FIG. 2 is a diagram for one example of the concept of an operation for a D2D user equipment to discover a neighbor cellular user equipment according to one embodiment of the present invention.

Referring to FIG. 2, a D2D user equipment WT1 is located in the same cell of user equipments MSa, MSb, MSc and MSd communicating with a base station using a cellular network.

In order to operate without interference between a data transmission of a cellular user equipment and a data transmission of a D2D user equipment in a cellular network, the D2D user equipment receives control information transmitted from a base station or may receive control information for performing a D2D communication by accessing a base station of a corresponding cell. In this case, the control information received from the base station by the D2D user equipment includes an information for the D2D user equipment to detect or discover a cellular user equipment transceiving data around the D2D user equipment. In particular, this control information can be transmitted to the D2D user equipment through a paging signal or a DL control signal transmitted from the base station. An information on a discovery signal may be transmitted to the cellular user equipment. For instance, the control information may be transmitted through a broadcasting signal. The discovery signal may be called a detection signal or the like. For clarity of the following description, the discovery signal may be commonly named a discovery reference signal (DRS).

In this case, an existing signal used to discover a cellular user equipment in a cellular network can be used as the DRS. For instance, a UL SRS (sounding reference signal) or DMRS (demodulation reference signal) transmitted to a base station by an existing cellular user equipment can be used as the DRS.

Moreover, as mentioned in the foregoing description, in order to discriminate a D2D peer discovery for discovering a counterpart D2D user equipment in order for a D2D user equipment to perform a D2D communication from a discovery of a neighbor cellular user equipment, resources for the respective discoveries can be designed orthogonal to each other in time, space, code, frequency and the like.

Having received the information on the DRS from the base station, the cellular user equipment transmits DRS periodically or in response to a request made by the D2D user equipment. Subsequently, the D2D user equipment is then able to recognize the cellular user equipment neighboring to the D2D user equipment by listening to or monitoring the DRS transmitted by the cellular user equipment.

Moreover, in order for the D2D user equipment to discover cellular user equipments actually causing interference to the D2D user equipment only and to reduce an information size of a neighbor cellular user equipment discovery list transmitted to the base station by the D2D user equipment, scheduled cellular user equipments may transmit DRS only or a base station can signal cellular user equipments that should transmit DRS.

As mentioned in the above description, the D2D user equipment having received the information on the DRS receives a DRS transmitted by a cellular user equipment in a cell. Having received the DRS transmitted by the cellular user equipment, the D2D user equipment creates a list or table of neighbor cellular user equipments having transmitted the corresponding discovery signal using the received DRS. In doing so, the D2D user equipment can obtain information (e.g., identification information on a cellular user equipment) on the cellular user equipment having transmitted the corresponding DRS using the received DRS information. And, the neighbor cellular user equipment list can be created with each cellular user equipment ID and an index for a signal sequence transmitted by each cellular user equipment.

The D2D user equipment can obtain a level of interference from each of the recognized neighbor cellular user equipments by measuring RCVP (received signal power) of the received DRS. And, a strength or interference level of the DRS received from each of the corresponding cellular user equipments can be included in the list of the neighbor cellular user equipments.

Thus, having created the neighbor list of cellular user equipments neighboring to the D2D user equipment, the D2D user equipment transmits the created list to the base station. In particular, every D2D user equipment can transmit the neighbor list to the base station. Alternatively, only a D2D user equipment intending to transceive data through a D2D communication actually may transmit the neighbor list to the base station. A D2D user equipment can periodically transmit the neighbor list to the base station. In particular, the D2D user equipment can transmit a whole list or a modified list only to the base station each time a cellular user equipment included in the neighbor list is modified.

Thus, the neighbor cellular user equipment list is created and then transmitted to the base station. If so, a complexity of the detection procedure or a signaling overhead may be increased. Hence, the D2D user equipment does not transmit the neighbor cellular user equipment list to the base station. Instead, the D2D user equipment can recommend a resource for the D2D communication in a manner of monitoring a resource band and then transmitting a resource having a smallest received signal strength to the base station.

Having received the neighbor list from the D2D user equipment in the cell, the base station can recognize cellular user equipments located neighbor to the user equipment intending to perform the D2D communication using the received list. Hence, in order to minimize the interference with the cellular user equipment when the D2D user equipment performs the D2D communication, the base station can enable the D2D user equipment to perform the D2D communication by allocating a resource not used by the cellular user equipments, which neighbor to the D2D user equipment, to the D2D user equipment. Moreover, the base station can enable the D2D user equipment to perform the D2D communication by allocating a resource used by a cellular user equipment having transmitted a received signal of a smallest strength in the list to the D2D user equipment in consideration of a strength of a signal of a neighbor cellular user equipment within the list transmitted by the D2D user equipment.

In the following description, a method for a D2D user equipment to perform a D2D communication by obtaining a presence of a neighbor cellular user equipment and a level of interference from a cellular user equipment through a DRS transmitted by the corresponding cellular user equipment is explained in detail.

2. 1. Procedure for D2D Communication

2. 1. 1. 1$^{st}$ Embodiment

Figure 3:
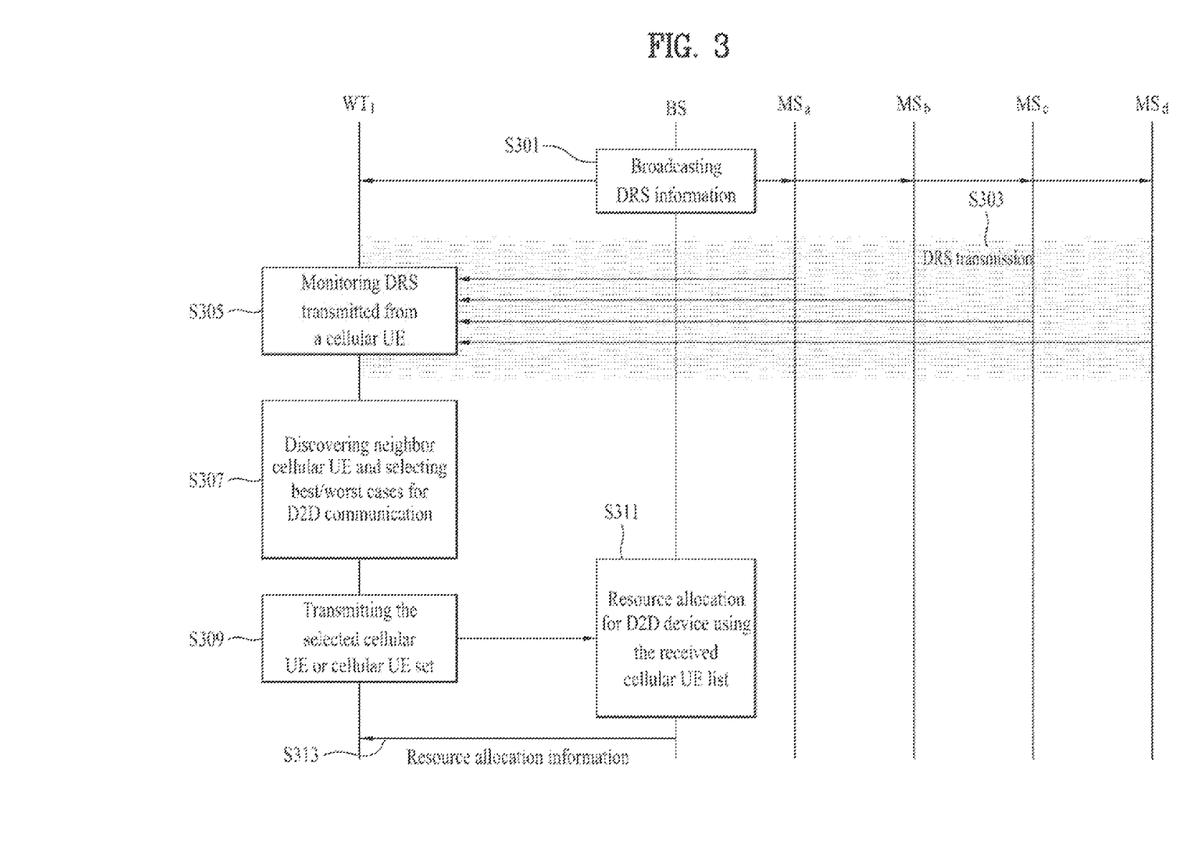
FIG. 3 is a diagram for one example of a method of performing a D2D communication according to one embodiment of the present invention.

FIG. 3 is a diagram for one example of a method of performing a D2D communication according to one embodiment of the present invention.

Referring to FIG. 3, a base station transmits DRS information to a D2D user equipment and a cellular user equipment [S301]. In particular, the base station can transmit the DRS information to the D2D user equipment and the cellular user equipment through a broadcasting signal.

As mentioned in the foregoing description, the DRS information means information on a DRS transmitted by a cellular user equipment to a D2D user equipment neighboring to the cellular user equipment in order for the D2D user equipment to discover the cellular user equipment neighboring to the D2D user equipment. The DRS transmitted by the cellular user equipment shall be described in '2. 2.' and the information on the DRS shall be described in '2. 3.'.

Having received the information on the DRS from the base station, the cellular user equipment transmits DRS to the neighbor D2D user equipment periodically or in response to a request made by the D2D user equipment [S303]. And, the D2D user equipment monitors the DRS transmitted by the neighbor cellular user equipment [S305].

The DRS monitoring D2D user equipment can discover neighbor cellular user equipments having transmitted the corresponding DRS using the received DRS and then selects a best/worst case for the D2D communication [S307]. The D2D user equipment can obtain identification informations of the cellular user equipments having transmitted the corresponding DRS through the received DRS or can obtain the neighbor cellular user equipments through a sequence of the received DRS, obtains a level of interference from each of the neighbor cellular user equipments by measuring a signal strength of the received DRS, and is then able to select the best or worst case for the D2D communication.

In particular, having obtained the neighbor cellular user equipments and the level of the interference with the neighbor cellular user equipments from the discovery, the D2D user equipment can configure a neighbor cellular user equipment or a cellular user equipment set, which causes a strongest interference in performing the D2D communication, using the obtained information. This worst case may correspond to the cellular user equipments in case that RCVP for the neighbor cellular user equipments obtained by the D2D user equipment exceeds a maximum (max) interference level or a maximum (max) signal power allowable for performing the D2D communication.

The D2D user equipment can configure an information or list of the rest of the neighbor user equipments obtained through the discovery except cellular user equipment(s) causing a greatest interference (i.e., having a strongest received signal strength) or a cellular user equipment set thereof. The cellular user equipments, of which RCVP for the neighbor user equipments obtained by the D2D user equipment is equal to or smaller than the maximum (max) interference level or the maximum (max) signal power, may correspond to the corresponding list.

The D2D user equipment can configure a neighbor cellular user equipment or a cellular user equipment set, which causes the smallest interference to the D2D user equipment in case that the D2D user equipment performs a D2D communication. In particular, the D2D user equipment can configure a cellular user equipment or a cellular user equipment set having the smallest signal strength. This best case may correspond to the cellular user equipments in case that RCVP for the neighbor cellular user equipments obtained by the D2D user equipment is smaller than a preset minimum interference level or a minimum signal power.

Thus, the D2D user equipment can receive information a threshold (e.g., SNR (signal to interference plus noise ratio), interference level, etc.) for performing the D2D and information on the number of neighbor cellular user equipments (the best or worst case), which is transmitted to the base station by the D2D user equipment, from the base station through upper layer signaling. And, the D2D user equipment can receive it through the information on the DRS, which is transmitted from the base station.

Subsequently, the D2D user equipment transmits the information on the neighbor cellular user equipment (or cellular user equipment set) causing the greatest interference to the D2D user equipment, the information on the rest of the cellular user equipments (or cellular user equipment set) except the neighbor cellular user equipment (or cellular user equipment set) causing the greatest interference to the D2D user equipment, or the information on the neighbor cellular user equipment (or cellular user equipment set) causing the smallest interference to the D2D user equipment to the base station [S309]. In this case, the information transmitted to the base station by the D2D user equipment can include identifiers (e.g., STID (station identifier), C-RNTI (cell radio network temporary identifier, virtual identifier, discovery identifier, etc.), received signal strengths, interference levels, resource indexes and the like of the cellular user equipments neighboring to the D2D user equipment.

The D2D user equipment can transmit the aforementioned information to the base station through a UE-specific control channel or a data channel. In doing so, since the D2D user equipment transmits the information to the base station, it is able to use a UL control channel.

In doing so, since a size of neighbor user equipment information transmitted by the D2D user equipment to the base station is considerably large, it may be difficult to transmit the information through the dedicated UL control channel at a time. For instance, in case of LTE system, although a length of information transmitted on a PUCCH (physical uplink control channel), which is a UL control channel, by a user equipment is maximum 20 bits, if an identifier of a cellular user equipment, which is discovered by the D2D user equipment, is transmitted using C-RNTI, since the C-RNTI amounts to 16 bits, information on a single cellular user equipment can be eventually transmitted on PUCCH at a time only.

In this case, the D2D user equipment can transmit the formerly obtained informations through the UL control channel over several times. For instance, the D2D user equipment can transmit the information of the cellular user equipment having the smallest signal strength or the smallest interference caused to the D2D user equipment or the information of the resource used by the corresponding cellular user equipment among the formerly obtained informations in order and is then able to transmit the corresponding information through the control channel over several times. On the contrary, the D2D user equipment can transmit the information of the cellular user equipment having the greatest signal strength or the greatest interference caused to the D2D user equipment or the information of the resource used by the corresponding cellular user equipment among the formerly obtained informations in order and is then able to transmit the corresponding information through the control channel over several times. Moreover, the D2D user equipment selects one portion from the obtained informations and is then able to transmit the selected portion. For instance, the information of the cellular user equipment having the smallest signal strength and the corresponding resource information can be transmitted in a manner of being configured into one or set.

Thus, since the control channel is used several times in order to transmit the information obtained by the D2D user equipment to the base station, it may cause a problem that a transmission time increases. Hence, in order to transmit the information obtained by the D2D user equipment to the base station at a time to decrease a period for transmitting the information obtained by the D2D user equipment, the D2D user equipment can transmit the information (e.g., neighbor cellular user equipment list or table) on the neighbor cellular user equipment obtained through the discovery using an uplink data channel (e.g., a physical uplink shared control channel (PUSCH)) assigned by the base station. In doing so, using an uplink data channel, the D2D user equipment can give the base station an indication that a discovery result is transmitted. The base station confirms that the discovery result will be transmitted on the uplink data channel through the indication information carried on the uplink control channel and is then able to receive the list of the cellular user equipments neighboring to the corresponding D2D user equipment, which is transmitted on the uplink data channel.

When the D2D user equipment transmits a control information for a D2D communication or an information on a neighbor cellular user equipment to the base station through PUSCH or PUCCH, if the transmitted information contends with another channel state information (CSI) (e.g., ACK/NACK (acknowledgement/negative-acknowledgement), RI (ranking indication), CQI (channel quality indicator), PMI (precoding matrix indicator), etc.) for a link to the base station, the transmission of the control information for D2D or the information on the neighbor cellular user equipment is delayed. Hence, the control information for D2D or the information on the neighbor cellular user equipment may be transmitted in a next period or dropped. In particular, the control information for D2D or the information on the neighbor cellular user equipment may have a lowest priority in an uplink transmission.

Moreover, in case of transmitting the control information for D2D or the information on the neighbor cellular user equipment using PUCCH or PUSCH, a channel coding scheme applied to the corresponding information may follow a method applied to a case of transmitting an existing CQI on PUCCH or PUSCH or a method applied to a case of transmitting an existing ACK/NACK and RI on PUCCH or PUSCH.

Having received the cellular user equipment list from the D2D user equipment, the base station allocates a resource for performing the D2D communication to the corresponding D2D user equipment [S311].

In particular, if the base station receives the information on the cellular user equipment (or cellular user equipment set) causing the greatest interference from the D2D user equipment, the base station allocates a resource to the D2D user equipment included in the list other than the resource used by the corresponding cellular user equipment (or cellular user equipment set).

Moreover, if the base station receives the information on the cellular user equipment (or cellular user equipment set) except the cellular user equipment (or cellular user equipment set) causing the greatest interference or the information on the cellular user equipment (or cellular user equipment set) causing the smallest interference from the D2D user equipment, the base station allocates a resource, which was allocated to the cellular user equipment (or cellular user equipment set) included in the list, to the D2D user equipment.

Subsequently, the base station transmits the information on the resource allocated to perform the D2D communication to the corresponding D2D user equipment [S313]. In doing so, the base station may be able to transmit the information on the resource allocated for performing the D2D communication to both a D2D pair.

In this case, the resource information for the D2D communication operation can be used as a scheduling information for the base station to allocate a resource to a cellular user equipment in a cell. In particular, the base station allocates the resource used by the D2D user equipment to a cellular user equipment causing less interference, thereby reducing mutual interference influence.

Since cellular user equipments neighboring to the D2D user equipment can receive allocation of a resource for a data transmission from the base station by constant periods, the resource used by the cellular user equipment can be changed by constant periods eventually. Thus, since a resource usable by the D2D user equipment without interference is changeable, an update of the information obtained by the D2D user equipment should be performed. In doing so, such an update can proceed to correspond to a scheduling timing of the cellular user equipment. In particular, the steps S307 to S313 can be repeated to correspond to the scheduling timing of the cellular user equipment.

In the D2D pair to which the resource for performing the D2D communication is allocated, a transmitting D2D (Tx D2D) user equipment transmits a D2D transmission request signal to a receiving D2D (Rx D2D) user equipment prior to performing a data transmission through the allocated resource. Having received the D2D transmission request signal, the Rx D2D user equipment can obtain a channel between the two user equipments and a corresponding channel state from the received signal. Subsequently, the Rx D2D user equipment transmits the channel information obtained from the received signal to the Tx D2D user equipment through a response signal. And, the data transmitting user equipment (Tx D2D) determines a power control and a transmission scheme (e.g., modulation, coding, MIMO, etc.) required for performing the D2D communication and is then able to perform the D2D communication. Moreover, in case that the Rx D2D user equipment fails to receive the D2D transmission request signal correctly, it is able to request a retransmission of the D2D transmission request signal by transmitting a NACK signal. In doing so, the ACK/NACK signal for the D2D transmission request signal can be transmitted in a manner of being configured in a separate format in order to be discriminated from ACK/NACK signal for a user equipment to indicate a presence or non-presence of a reception of data communication with a base station. Moreover, in case that the user equipment does not transceive data with the base station except the control information for the D2D, since the ACK/NACK signal for the D2D transmission request signal has no chance to be confused with the ACK/NACK signal for cellular data, it can be transmitted in the same format of an existing ACK/NACK signal.

2. 1.2. 2nd Embodiment

Figure 4:
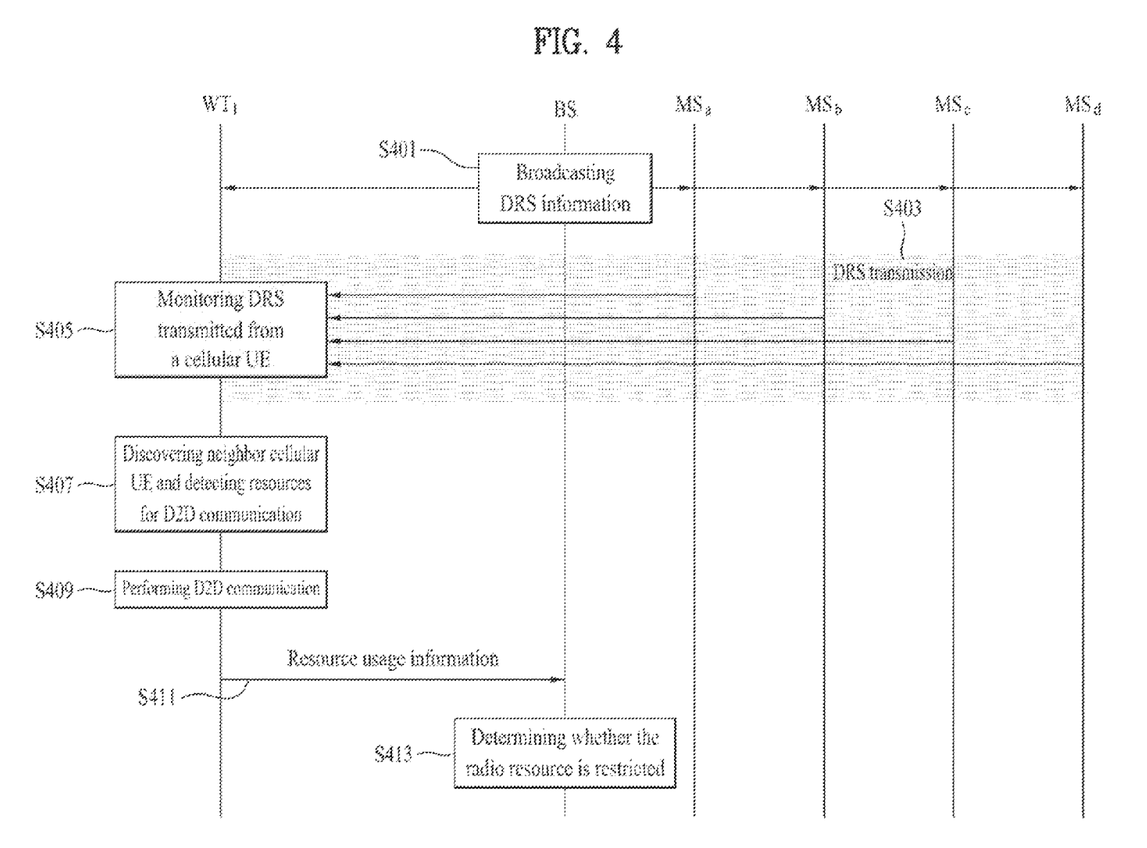
FIG. 4 is a diagram for one example of a method of performing a D2D communication according to one embodiment of the present invention.

FIG. 4 is a diagram for one example of a method of performing a D2D communication according to one embodiment of the present invention.

Referring to FIG. 4, a base station transmits DRS information to a D2D user equipment and a cellular user equipment [S401]. In particular, the base station can transmit the DRS information to the D2D user equipment and the cellular user equipment through a broadcasting signal. DRS transmitted by the cellular user equipment shall be described in '2. 2.' and information on the DRS shall be described in '2. 3.'.

As mentioned in the foregoing description, the DRS information means information on a DRS transmitted by a cellular user equipment to a D2D user equipment neighboring to the cellular user equipment in order for the D2D user equipment to discover the cellular user equipment neighboring to the D2D user equipment.

Having received the information on the DRS from the base station, the cellular user equipment transmits DRS to the neighbor D2D user equipment periodically or in response to a request made by the D2D user equipment [S403]. And, the D2D user equipment monitors the DRS transmitted by the neighbor cellular user equipment [S405].

The DRS monitoring D2D user equipment can discover neighbor cellular user equipments having transmitted the corresponding DRS using the received DRS, detects a resource for performing a D2D communication [S407], and then performs the D2D communication using the detected resource information [S409]. In particular, like a user equipment obtains a resource not used by other user equipments by monitoring a resource band using a cognitive radio and then uses the obtained resource, the D2D user equipment receives DRS transmitted by neighbor cellular user equipments by monitoring a resource band, selects a resource having the smallest strength of the received DRS, and is then able to perform the D2D communication using the selected resource.

A transmitting D2D (Tx D2D) user equipment selects a resource for performing the D2D communication by the above-described method. The Tx D2D user equipment transmits a D2D transmission request signal to a receiving D2D (Rx D2D) user equipment prior to performing a data transmission through the selected resource. Having received the D2D transmission request signal, the Rx D2D user equipment can obtain a channel between the two user equipments and a corresponding channel state from the received signal. Subsequently, the Rx D2D user equipment transmits the channel information obtained from the received signal to the Tx D2D user equipment through a response signal. And, the data transmitting user equipment (Tx D2D) determines a power control and a transmission scheme (e.g., modulation, coding, MIMO, etc.) required for performing the D2D communication and is then able to perform the D2D communication. Moreover, in case that the Rx D2D user equipment fails to receive the D2D transmission request signal correctly, it is able to request a retransmission of the D2D transmission request signal by transmitting a NACK signal. In doing so, the ACK/NACK signal for the D2D transmission request signal can be transmitted in a manner of being configured in a separate format in order to be discriminated from ACK/NACK signal for a user equipment to indicate a presence or non-presence of a reception of data communication with a base station. Moreover, in case that the user equipment does not transceive data with the base station except the control information for the D2D, since the ACK/NACK signal for the D2D transmission request signal has no chance to be confused with the ACK/NACK signal for cellular data, it can be transmitted in the same format of an existing ACK/NACK signal.

The D2D user equipment transmits information on the resource used for the D2D communication to the base station [S411]. In doing so, the D2D user equipment can transmit the information on the resource used for the D2D communication to the base station through a UE-specific control channel or a data channel. In this case, if the corresponding information is transmitted on an uplink data channel, the D2D user equipment can give the base station an indication that the information is transmitted on the uplink data channel. In doing so, as an example of the uplink control channel, there may be PUCCH. As an example of the uplink data channel, there may be PUSCH.

When the D2D user equipment transmits the information on the resource used for the D2D communication to the base station through PUSCH or PUCCH, if the transmitted information contends with another channel state information (CSI) (e.g., ACK/NACK, RI, CQI, PMI, etc.) for a link to the base station, the transmission of the information on the resource used for the D2D communication is delayed. Hence, the information on the resource used for the D2D communication may be transmitted in a next period or dropped. In particular, the information on the resource used for the D2D communication may have a lowest priority in an uplink transmission.

Moreover, in case of transmitting the information on the resource used for the D2D communication using PUCCH or PUSCH, a channel coding scheme applied to the corresponding information may follow a method applied to a case of transmitting an existing CQI on PUCCH or PUSCH or a method applied to a case of transmitting an existing ACK/NACK and RI on PUCCH or PUSCH.

Having received the information on the resource used by the corresponding D2D user equipment for the D2D communication from the D2D user equipment, the base station determines whether to put restriction on a resource use of the D2D user equipment [S413]. In particular, having received the resource information for the D2D communication from the D2D user equipment, the base station can restrict the resource use of the D2D user equipment in consideration of an interference level or SINR fed back by a cellular user equipment currently using the same resource of the corresponding D2D user equipment. In more particular, if the user equipment currently using the same resource receives considerable interference equal to or greater than a specific threshold due to the D2D communication, the base station may transmit a discovery request signal for a new resource or a use stop signal for stopping using a currently used resource to the D2D user equipment. Having received the discovery request signal or the use stop signal from the base station, the D2D user equipment performs a monitoring on a resource band again, detects another resource region having a minimum reception strength, and then uses the detected resource region. Alternatively, the D2D user equipment uses a resource having a reception strength next to the minimum reception strength or a $2^{nd}$ smallest reception strength among the resources detected in the step S407 and gives the base station an indication of using the corresponding resource.

Meanwhile, the information on the resource used for the D2D communication may be transmitted to the base station before the D2D communication is performed. In particular, after a resource having a smallest strength of a received DRS has been obtained, it is able to transmit information on the obtained resource to the base station in the first place before performing the D2D communication using the obtained resource.

Figure 5:
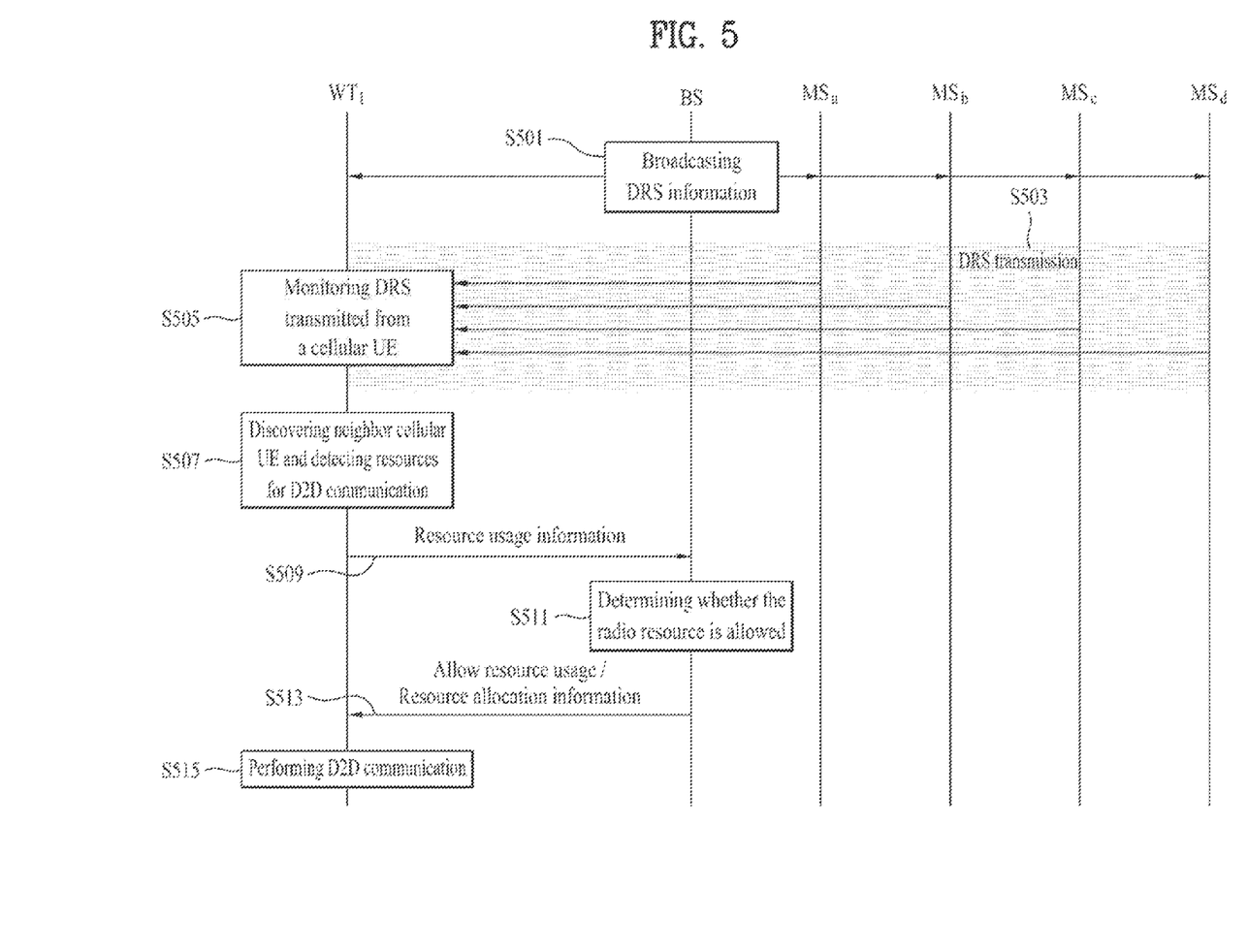
FIG. 5 is a diagram for one example of a method of performing a D2D communication according to one embodiment of the present invention.

FIG. 5 is a diagram for one example of a method of performing a D2D communication according to one embodiment of the present invention. Since the steps S501 to S507 in FIG. 5 are identical to the former steps S401 to S407 in FIG. 4, their details shall be omitted from the following description.

Referring to FIG. 5, having detected a resource for performing a D2D communication, a D2D user equipment transmits information on a resource to use for a D2D communication to a base station [S509]. In doing so, the D2D user equipment can transmit the information on the resource to use for the D2D communication to the base station through a UE-specific control channel or a data channel. In this case, if the corresponding information is transmitted on an uplink data channel, the D2D user equipment can give the base station an indication that the information is transmitted on the uplink data channel. In doing so, as an example of the uplink control channel, there may be PUCCH. As an example of the uplink data channel, there may be PUSCH.

When the D2D user equipment transmits the information on the resource to use for the D2D communication to the base station through PUSCH or PUCCH, if the transmitted information contends with another channel state information (CSI) (e.g., ACK/NACK, RI, CQI, PMI, etc.) for a link to the base station, the transmission of the information on the resource to use for the D2D communication is delayed. Hence, the information on the resource to use for the D2D communication may be transmitted in a next period or dropped. In particular, the information on the resource to use for the D2D communication may have a lowest priority in an uplink transmission.

Moreover, in case of transmitting the information on the resource to use for the D2D communication using PUCCH or PUSCH, a channel coding scheme applied to the corresponding information may follow a method applied to a case of transmitting an existing CQI on PUCCH or PUSCH or a method applied to a case of transmitting an existing ACK/NACK and RI on PUCCH or PUSCH.

Having received the information on the resource to be used by the corresponding D2D user equipment for the D2D communication from the D2D user equipment, the base station determines whether to grant a resource use of the D2D user equipment [S511].

After the base station has received the resource information for the D2D communication from the D2D user equipment, if a user equipment currently using the same resource of the corresponding D2D user equipment does not receive interference equal to or greater than a specific threshold due to the D2D communication, the base station transmits a resource use grant signal to the user equipment [S513]. In particular, in case of allocating the resource obtained by the D2D user equipment to the corresponding D2D user equipment, the base station can transmit the resource use grant signal.

On the other hand, the base station can restrict the resource use of the D2D user equipment in consideration of an interference level or SINR fed back by a cellular user equipment currently using the same resource of the corresponding D2D user equipment. In particular, if the user equipment currently using the same resource receives considerable interference equal to or greater than a specific threshold due to the D2D communication, the base station can allocate a new resource to the D2D user equipment. In this case, the base station may transmit an information on the newly allocated resource to the D2D user equipment.

Moreover, if the user equipment currently using the same resource receives considerable interference equal to or greater than a specific threshold due to the D2D communication, the base station may transmit a discovery request signal for a new resource or a use stop signal for stopping using a currently used resource to the D2D user equipment. Having received the discovery request signal or the use stop signal from the base station, the D2D user equipment performs a monitoring on a resource band again, detects another resource region having a minimum reception strength, and then uses the detected resource region. Alternatively, the D2D user equipment uses a resource having a reception strength next to the minimum reception strength or a $2^{nd}$ smallest reception strength among the resources detected in the step S507 and gives the base station an indication of using the corresponding resource.

Having received the resource allocation information or the resource use grant signal from the base station, the D2D user equipment performs the D2D communication [S515]. In particular, in case of receiving the resource allocation information from the base station, the D2D user equipment can perform the D2D communication using the resource allocated through the resource allocation information. In particular, in case of receiving the use grant signal for using the resource obtained by the D2D user equipment from the base station, the D2D user equipment can perform the D2D communication using the corresponding resource.

As mentioned in the above description, a resource information for a D2D communication operation measured by a D2D user equipment can be used as a scheduling information for a base station to allocate a resource to a cellular user equipment within a cell. In particular, the base station allocate the resource used the D2D user equipment to the cellular user equipment causing less interference, thereby decreasing interference in-between.

Moreover, cellular user equipments neighboring to a D2D user equipment may receive allocation of a resource for a data transmission from a base station by constant periods, whereby a resource used by the cellular user equipment may change by constant periods. Therefore, since a resource usable by the D2D user equipment without interference may change, it is necessary to update information obtained by the D2D user equipment. And, such an update may proceed to correspond to a scheduling timing of the cellular user equipment. In particular, the steps S407 to S413 in FIG. 4 or the steps S504 to S514 in FIG. 5 may be repeated to correspond to the scheduling timing of the cellular user equipment.

2. 2. DRS (Discovery Reference Signal)

An existing SRS may be used as a DRS transmitted by a cellular user equipment in order for a D2D user equipment to discover a neighbor cellular user equipment. Instead, a separate signal except SRS can be used as a DRS.

2. 2. 1. Case of Not Using SRS

If an existing SRS is not used as a DRS transmitted by a cellular user equipment in order for a D2D user equipment to discover a neighbor cellular user equipment, the cellular user equipment can transmit DRS using a symbol of an uplink resource allocated by a base station.

The number of symbols allocated for a DRS transmission may be non-limited. And, the number of transmission symbols of DRS can be received from a base station through a broadcast signal. In doing so, if a subframe having SRS not transmitted therein is used while minimizing influence on a data transmission of a cellular user equipment, it is able to use a single symbol in order to use the same region as an SRS transmitted region. Moreover, the cellular user equipment is able to transmit DRS periodically through a symbol allocated for the DRS and can receive a transmission period of the DRS from a base station through a broadcast signal.

The cellular user equipment uses the SRS transmitted subframe to transmit the DRS but does not transmit both of the DRS and the SRA simultaneously using the same symbol. In case that the cellular user equipment transmits the DRS in the same subframe as the SRS transmitted subframe, a location of the DRS transmitted symbol may be known to both of the user equipment and the base station in a manner of being determined in advance or may be notified to the user equipment by the base station through a broadcast signal. For example of the location of the DRS transmitted symbol, the DRS can be transmitted through a symbol located right in front or rear of the SRS transmitted symbol.

Moreover, as mentioned in the foregoing description, a cellular user equipment can periodically transmit DRS on a symbol allocated for the DRS. In doing so, a transmission period of the DRS may be non-limited. For instance, it is able to transmit the DRS in the same frame by the same period in consideration of a timing point at which a base station updates a scheduling information on the cellular user equipment using the SRS transmitted by the cellular user equipment. And, the cellular user equipment performs a data transmission to the base station using the rest of symbols except the DRS transmitted symbol.

Moreover, the cellular user equipment may be able to use a subframe having SRS not transmitted therein in order to transmit the DRS.

Figure 6:
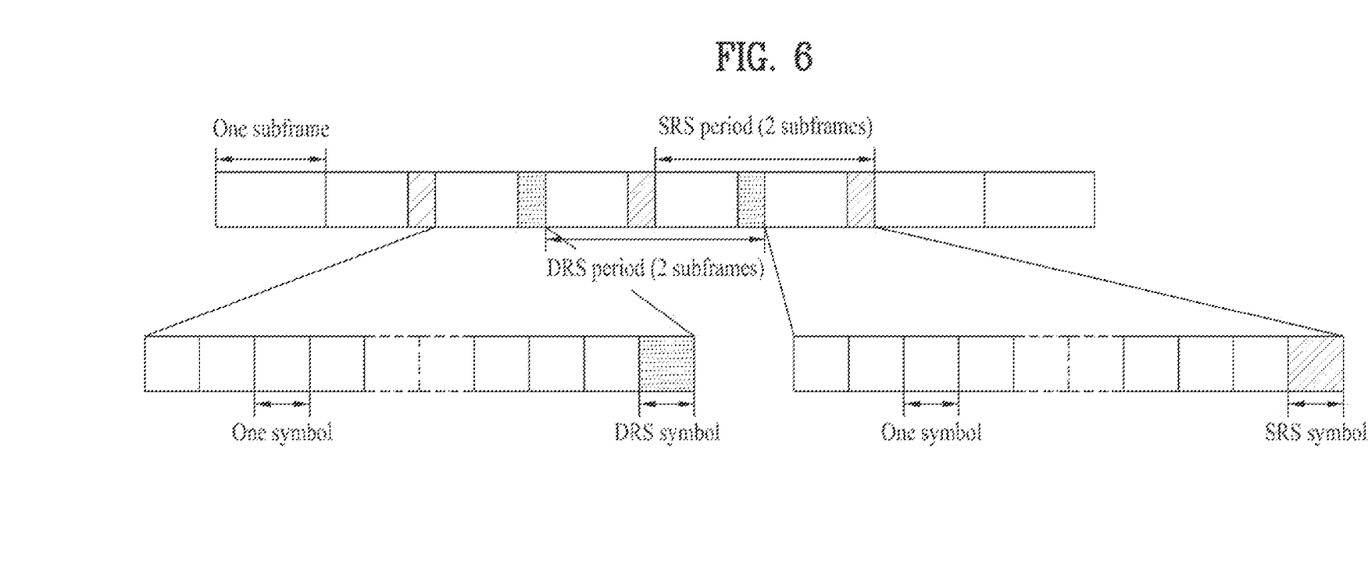
FIG. 6 is a diagram for one example of a frame structure for a DRS transmission according to one embodiment of the present invention.

FIG. 6 is a diagram for one example of a frame structure for a DRS transmission according to one embodiment of the present invention.

Referring to FIG. 6, although a symbol used for a DRS transmission by a cellular user equipment does not overlap with a symbol including SRS transmitted to a base station by the cellular user equipment, the cellular user equipment is able to transmit a DRS using the symbol located at the same location of the SRS transmitted symbol in a subframe having the SRS not transmitted therein. In particular, the cellular user equipment can transmit the DRS using a last symbol in the subframe having the SRS not transmitted therein. In doing so, when a specific cellular user equipment transmits a DRS symbol, if another user equipment sends an SRS to the base station, mutual interference can be caused. Hence, it is advantageous for DRS symbol assignment to be designed to avoid interference with all SRS symbols in a system.

Moreover, as mentioned in the foregoing description, the cellular user equipment can periodically transmit the DRS using the symbol allocated for the DRS. In doing so, a transmission period of the DRS may be non-limited. For instance, in consideration of a timing point at which the base station updates the scheduling information on the cellular user equipment using the SRS transmitted by the cellular user equipment, it is able to transmit the DRS in a subframe using the same period of the SRS after transmitting the SRS.

And, the cellular user equipment performs a data transmission to the base station using the rest of symbols except the DRS transmitted symbol.

Thus, as the cellular user equipment does not transmit the DRS together with the data irrespective of whether the cellular user equipment uses the SRS transmitted subframe to transmit the DRS, the D2D user equipment can obtain an identification information on the cellular user equipment and an information on a channel between the user equipments through the DRS. In particular, the DRS may include an identifier of the cellular user equipment. Alternatively, the cellular user equipment receives assignment of a different sequence from the base station in a process for the cellular user equipment to access the base station and is then able to use it for the DRS transmission. In this case, if the cellular user equipment transmits DRS using a different sequence (e.g., UE-specific sequence), the D2D user equipment receives the DRS transmitted through DRS symbol, lists up an index of a sequence of the corresponding DRS, and is then able to transmit it to the base station. The base station can obtain the cellular user equipment having the index of the corresponding sequence assigned thereto and is also able to obtain an information on a resource used by the corresponding cellular user equipment.

2. 2. 2. Case of Using SRS

In case that a D2D user equipment uses an SRS transmitted to a base station by a cellular user equipment as a DRS transmitted by the cellular user equipment in order to discover a neighbor cellular user equipment, the D2D user equipment can receive information on identifiers of cellular user equipments in a cell and a UE-specific SRS from the base station. Yet, since the base station shares this information with the D2D user equipment, other random user equipments can decode data transmissions of the cellular user equipments. Hence, it may cause a problem of data security. Moreover, since SRS is performed through a power control between the base station and each cellular user equipment, it may cause a problem in lowering reliability on a received signal strength measured in a manner that the D2D user equipment unaware of the power control information monitors the SRS. In order to prevent these problems, if a DRS is configured not using STID or C-RNTI assigned to the cellular user equipment but using a virtual identifier or a discovery identifier assigned by the base station for the discovery, it is able to raise the security of the data transmitted by cellular user equipments. Moreover, if the base station transmits the power control information on the DRS transmitted by the cellular user equipment to the D2D user equipment, it is able to accurately obtain the influence of interference caused by the neighbor cellular user equipment through a signal strength of the DRS transmitted from the cellular user equipment.

2. 3. DRS (Discovery Reference Signal) Information Transmission

D2D user equipment can receive information for performing a discovery of a cellular user equipment neighboring to the D2D user equipment through a paging signal or a DL control channel of a base station.

2. 3. 1. Paging Signal Use

D2D user equipment in a cellular network can receive information for a cellular user equipment discovery through a paging signal transmitted by a base station. In this case, the information transmitted by the base station through the paging signal is described as follows.

1) Sequence set or sequence information assigned to a cellular user equipment—a case that a base station assigns a UE-specific sequence to each cellular user equipment 2) DRS transmission period 3) DRS transmission length 4) Configuration information—start point information (offset or subframe index), symbol index Having received the DRS information through the aforementioned paging signal, the D2D user equipment can create a neighbor list by obtaining cellular user equipments neighboring to the D2D user equipment in a manner of receiving DRS transmitted by the cellular user equipments. Subsequently, the D2D user equipment is able to transmit the neighbor list (STID, sequence index, RCVP, etc. included) of the neighbor cellular user equipments through the discovery to the base station together with such information as a D2D indicator, a D2D user equipment identifier and the like. Having received the above information from the D2D user equipment, the base station selects a resource, which minimizes interference with an existing cellular user equipment, in consideration of resources used by the cellular user equipments included in the list, received signal strengths and the like and then transmits information on the selected resource to the D2d user equipment. In doing so, resource allocation (RA) selected for the D2D communication by the base station can be transmitted to each D2D user equipment pair through a unicast signal.

2. 3. 2. Using DL Control Signal

A D2D user equipment accesses a base station in the same manner of a cellular user equipment and is able to indicate that it is a D2D user equipment in the step of performing a registration. Alternatively, the D2D user equipment can indicate that it is a D2D user equipment in the step after the registration.

In the access step, the base station can obtain a presence or non-presence of a D2D user equipment in a cell from the indication given by the D2D. And, the D2D user equipment receives a DL control signal (e.g., a preamble, a broadcast channel (BCH), a physical downlink control channel (PDCCH), etc.) from the base station. Having obtained the presence of the D2D user equipment, the base station broadcasts information on a DRS to all user equipments in the cell through the downlink control signal for a discovery of the D2D user equipment so that the information can be shared with all the user equipments in the cell. For instance, the base station can inform the user equipments in the cell and the D2D user equipment of a frame information for a neighbor discovery, a sequence information (e.g., set, length, etc.), information on a transmission period, information on a transmit power (Tx power) and the like through BCH or PDCCH. Thus, having received the information on the DRS through the downlink control signal, the cellular user equipment transmits the DRS in a determined symbol. The D2D user equipment receives the DRS transmitted by the cellular user equipment by monitoring a DRS transmitted region obtained from the information on the DRS. Subsequently, the D2D user equipment obtains a cellular user equipment neighboring to the D2D user equipment based on the received DRS and then creates a list or table of the neighbor cellular user equipments. Having obtained the cellular user equipments neighboring to the D2D user equipment, the corresponding D2D user equipment transmits the created list to the base station through an uplink channel (e.g., a physical uplink control channel (PUCCH)) assigned by the base station. Subsequently, having received the list from the D2D user equipment, the base station allocates a resource having a smallest interference on a D2D communication performed by the corresponding D2D user equipment, i.e., a resource not used by the neighbor cellular user equipments or a resource having a smallest influence on a communication in-between, to the D2D user equipment.

3. The General of Invention Applicable Device

Figure 7:
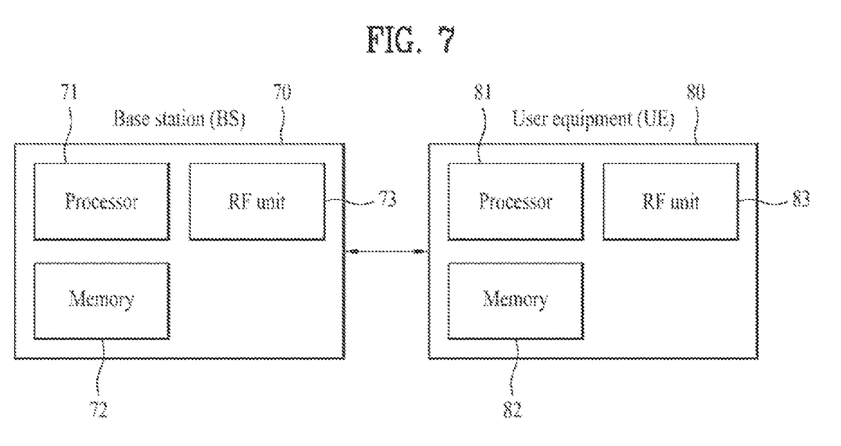
FIG. 7 is a block diagram of a wireless communication device according to an embodiment of the present invention.

FIG. 7 is a block diagram of a wireless communication device according to an embodiment of the present invention.

Referring to FIG. 7, a wireless communication system includes a base station 70 and a plurality of user equipments 80 located in an area of the base station 70. The user equipment 80 shown in FIG. 7 can become the D2D user equipment or the cellular user equipment in the description of the former embodiments.

The base station 70 includes a processor 71, a memory 72 and an RF (radio frequency) unit 73. The processor 71 implements the proposed functions, processes and/or methods. Layers of a radio interface protocol can be implemented by the processor 71. The memory 72 is connected to the processor 71 and stores various kinds of informations for driving the processor 71. The RF unit 73 is connected to the processor 71 and transmits and/or receives a radio signal.

The user equipment 80 includes a processor 81, a memory 82 and an RF (radio frequency) unit 83. The processor 81 implements the proposed functions, processes and/or methods. Layers of a radio interface protocol can be implemented by the processor 81. The memory 82 is connected to the processor 81 and stores various kinds of informations for driving the processor 81. The RF unit 83 is connected to the processor 81 and transmits and/or receives a radio signal.

The memory 72/82 may be provided inside or outside the processor 71/81 and may be connected to the processor 71/81 via at least one of well-known means. The base station 70 and/or the user equipment 80 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A data transceiving method according to the present invention is applicable to various kinds of wireless access systems as well as to 3GPP LTE/LTE-A system or IEEE 802 system.

What is claimed is:

1. In a wireless access system supportive of a D2D (device-to-device) communication, a method of performing the D2D communication by a D2D user equipment, the method comprising:
    receiving information on a DRS (discovery reference signal) transmitted by a cellular user equipment performing a communication using a cellular network from a base station;
    monitoring the DRS transmitted from at least one neighbor cellular user equipment;
    selecting a resource having a smallest strength of a signal in the DRS received from the at least one neighbor cellular user equipment;
    if the D2D user equipment does not receive a discovery request signal for restricting a use of the selected resource from the base station, performing the D2D communication with a different D2D user equipment using the selected resource; and
    if the D2D user equipment receives the discovery request signal for restricting the use of the selected resource from the base station,
        reselecting a resource having a 2nd smallest strength of a signal in the DRS received from the at least one neighbor cellular user equipment, and
        performing the D2D communication with the different D2D user equipment using the reselected resource.

2. The method of claim 1, further comprising:
    transmitting information on the selected resource to the base station; and
    receiving a signal for granting a use of the selected resource from the base station.

3. The method of claim 1, wherein the information on the DRS is transmitted through a paging signal or a downlink control signal.

4. The method of claim 1, wherein the information on the DRS comprises at least one of a DRS transmission period, a DRS transmission length, or a DRS transmission start point.

5. The method of claim 1, wherein the DRS is transmitted through a symbol located right next or previous to an SRS (sounding reference signal) transmitted symbol.

6. The method of claim 1, wherein the DRS comprises an SRS (sounding reference signal).

7. In performing a D2D (device-to-device) communication in a wireless access system supportive of the D2D (device-to-device) communication, a D2D user equipment comprising:
    an RF (radio frequency) unit configured to transceive a radio signal; and
    a processor configured to:
        receive information on a DRS (discovery reference signal) transmitted by a cellular user equipment performing a communication using a cellular network from a base station,
        monitor the DRS transmitted from at least one cellular neighbor user equipment,
        select a resource having a smallest strength of a signal in the DRS received from the at least one cellular neighbor user equipment,
        if the D2D user equipment does not receive a discovery request signal for restricting a use of the selected resource from the base station, perform the D2D communication with a different D2D user equipment using the selected resource, and
        if the D2D user equipment receives the discovery request signal for restricting the use of the selected resource from the base station, reselect a resource having a 2nd smallest strength of a signal in the DRS received from the at least one neighbor cellular user equipment and perform the D2D communication with the different D2D user equipment using the reselected resource.

* * * * *